(12) United States Patent
Arokkiam et al.

(10) Patent No.: US 12,402,064 B2
(45) Date of Patent: Aug. 26, 2025

(54) TELECOMMUNICATIONS NETWORK

(71) Applicant: BRITISH TELECOMMUNICATIONS PUBLIC LIMITED COMPANY, London (GB)

(72) Inventors: Jerome Arokkiam, London (GB); Simon Ringland, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 0 days.

(21) Appl. No.: 18/873,964

(22) PCT Filed: May 5, 2023

(86) PCT No.: PCT/EP2023/061926
§ 371 (c)(1),
(2) Date: Dec. 11, 2024

(87) PCT Pub. No.: WO2023/241856
PCT Pub. Date: Dec. 21, 2023

(65) Prior Publication Data
US 2025/0168743 A1 May 22, 2025

(30) Foreign Application Priority Data

Jun. 13, 2022 (EP) .................... 22178707

(51) Int. Cl.
*H04W 40/24* (2009.01)
*H04L 45/74* (2022.01)
(Continued)

(52) U.S. Cl.
CPC .......... *H04W 40/248* (2013.01); *H04L 45/74* (2013.01); *H04W 24/02* (2013.01); *H04W 84/12* (2013.01)

(58) Field of Classification Search
None
See application file for complete search history.

(56) References Cited

U.S. PATENT DOCUMENTS

| 7,415,535 B1 | 8/2008 | Kuik et al. |
| 10,251,049 B2 | 4/2019 | Seidman et al. |

(Continued)

FOREIGN PATENT DOCUMENTS

| CN | 108667951 B | 4/2021 |
| CN | 110493363 B | 5/2022 |

(Continued)

OTHER PUBLICATIONS

International Preliminary Report on Patentability dated Dec. 26, 2024, issued for International Application No. PCT/EP2023/061913 (10 pages).

(Continued)

*Primary Examiner* — Brian S Roberts
(74) *Attorney, Agent, or Firm* — Nixon & Vanderhye P.C.

(57) ABSTRACT

This invention provides a method of operating a wireless local area network, the wireless local area network including a user device, a wireless access point and a wireless repeater, wherein the wireless repeater is configured to virtualise a Media Access Control, MAC, address of the user device when the user device is connected to the wireless repeater, the method comprising the steps of: obtaining data including a first plurality of records, wherein each record of the first plurality of records relates to the user device and includes a MAC address and a signal strength value; obtaining data including a second plurality of records, wherein each record of the second plurality of records includes a Basic Service Set Identifier, BSSID, and a signal strength value; for each MAC address in the first plurality of records: identifying a record of the second plurality of records having a BSSID that sufficiently matches the MAC address by determining a (Continued)

similarity between an Organisationally Unique Identifier, OUI, of the BSSID and the OUI of the MAC address, determining that a difference between the signal strength value associated with the identified record of the second plurality of records and the signal strength value associated with the MAC address of the first plurality of records is within a threshold, assigning a first hop repeater identifier to each record of the first plurality of records having the MAC address based on the BSSID of the identified record of the second plurality of records; and causing a reconfiguration in the wireless local area network based on the first hop repeater identifier.

19 Claims, 7 Drawing Sheets

(51) Int. Cl.
*H04W 24/02* (2009.01)
*H04W 84/12* (2009.01)

(56) References Cited

U.S. PATENT DOCUMENTS

| | | | |
|---|---|---|---|
| 10,862,885 | B2 | 12/2020 | Zhang et al. |
| 10,979,848 | B1 | 4/2021 | Palappetty et al. |
| 2002/0031101 | A1 | 3/2002 | Petite et al. |
| 2005/0044273 | A1 | 2/2005 | Bouchat et al. |
| 2007/0001490 | A1 | 1/2007 | Lee |
| 2008/0031185 | A1* | 2/2008 | Bims ............... H04W 12/08 370/328 |
| 2009/0265455 | A1 | 10/2009 | Hiraki |
| 2010/0165910 | A1* | 7/2010 | Mathews ......... H04B 7/15528 370/315 |
| 2011/0191827 | A1 | 8/2011 | Balay |
| 2012/0155473 | A1 | 6/2012 | Figueira et al. |
| 2013/0237242 | A1 | 9/2013 | Oka |
| 2014/0098705 | A1 | 4/2014 | Chow et al. |
| 2015/0009901 | A1 | 1/2015 | Gorajala Chandra et al. |
| 2016/0081009 | A1 | 3/2016 | Tailor et al. |
| 2016/0330165 | A1 | 11/2016 | Jeanne et al. |
| 2017/0347301 | A1* | 11/2017 | Stationwala ............ H04W 8/26 |
| 2019/0318028 | A1 | 10/2019 | Cao |
| 2020/0344203 | A1* | 10/2020 | Mermoud ......... H04L 61/5014 |
| 2021/0112097 | A1 | 4/2021 | Jiang et al. |
| 2021/0409316 | A1 | 12/2021 | Seshan |
| 2024/0381096 | A1 | 11/2024 | Beg |

FOREIGN PATENT DOCUMENTS

| | | |
|---|---|---|
| EP | 3174363 A1 | 5/2017 |
| WO | 2021104657 A1 | 6/2021 |
| WO | 2022029415 A1 | 2/2022 |

OTHER PUBLICATIONS

Communication under Rule 71(3) EPC dated Dec. 2, 2024, issued for European Application No. 22 835 808.1 (8 pages).
First Notification of Office Action dated Nov. 22, 2024, issued for Chinese Application No. 202280084656.9 (7 pages).
International Preliminary Report on Patentability dated Dec. 18, 2023, issued for International Application No. PCT/EP2022/086246 (9 pages).
Shuhei Akiyama et al., "A study on Device Identification from BLE Advertising Packets with Randomized MAC Addresses", 2021 IEEE International Conference on Consumer Electronics-Asia (ICCEASIA), IEEE, Nov. 1, 2021, 4 pages.
Marco Uras et al., "WiFi Probes sniffing: an Artificial Intelligence based approach for MAC addresses de-randomization", 2020 IEEE 25th International Workshop on Computer Aided Modeling and Design of Communication Links and Networks (CAMAD), Sep. 14, 2020, 6 pages.
GB Combined Search and Examination Report for GB2200253.9, dated Jul. 1, 2022, 5 pages.
GB Combined Search and Examination Report for GB2200251.3, dated Jul. 1, 2022, 6 pages.
GB Combined Search and Examination Report for GB2208625.0, dated Nov. 3, 2022, 5 pages.
GB Examination Report for GB2208625.0, dated Jul. 12, 2023, 3 pages.
GB Examination Report for GB2200251.3, dated Jan. 18, 2023, 3 pages.
GB Examination Report for GB2200253.9, dated Jan. 18, 2023, 3 pages.
GB Search Report for GB2208631.8, dated Nov. 2, 2022, 4 pages.
GB Intention to Grant for GB2200253.9, dated Jun. 26, 2024, 2 pages.
GB Intention to Grant for GB2200251.3, dated Jun. 26, 2024, 2 pages.
GB Examination Report and Notification of Intention to Grant for GB2208631.8, dated May 20, 2024, 2 pages.
GB Intention to Grant for GB2208625.0, dated Apr. 4, 2024, 2 pages.
Extended European Search Report for EP22178707.0, dated Nov. 16, 2022, 8 pages.
Extended European Search Report for EP22178706.2, dated Oct. 13, 2022, 7 pages.
International Search Report and Written Opinion of the ISA for PCT/EP2023/061913, mailed Aug. 10, 2023, 17 pages.
International Search Report and Written Opinion of the ISA for PCT/EP2022/086247, mailed Mar. 16, 2023, 15 pages.
Written Opinion of the IPEA for PCT/EP2022/086247, mailed Nov. 29, 2023, 9 pages.
International Search Report and Written Opinion of the ISA for PCT/EP2022/086246, mailed Apr. 5, 2023, 18 pages.
International Preliminary Report on Patentability for PCT/EP2022/086247, mailed Mar. 22, 2024, 17 pages.
International Search Report and Written Opinion of the ISA for PCT/EP2023/061926, mailed Jul. 21, 2023, 12 pages.
International Preliminary Report on Patentability for PCT/EP2023/061926, mailed Apr. 2, 2024, 12 pages.
Office Action dated Mar. 17, 2025 issued for U.S. Appl. No. 18/874,011 (7 pages).
Notice of Allowance dated May 20, 2025 issued for U.S. Appl. No. 18/874,011 (5 page).
Office Action dated Mar. 6, 2025 issued for U.S. Appl. No. 18/727,448 (12 pages).

\* cited by examiner

TELECOMMUNICATIONS NETWORK

CROSS-REFERENCE TO RELATED APPLICATIONS

This application is the U.S. national phase of International Application No. PCT/EP2023/061926 filed May 5, 2023, which designated the U.S. and claims priority to EP 22178707.0 filed Jun. 13, 2022, the entire contents of each of which are hereby incorporated by reference.

FIELD OF THE INVENTION

The present invention relates to a telecommunications network.

BACKGROUND

A Customer Premises Equipment (CPE) in a telecommunications network is a device typically located in a customer's home or business that connects the customer to an operator's network (such as a Digital Subscriber Line (DSL) network, a Fibre To The Premises (FTTP) network, and/or a cellular network). The CPE may also provide the customer with a local area network (including a wireless local area network) to connect one or more user devices to the network operator's network.

A CPE may be remotely managed by the network operator. Remote management may be implemented by an Auto-Configuration Server (ACS) using the TR-69 protocol (as standardised by the Broadband Forum). The TR-69 protocol defines a dataset that is periodically collected from the CPE for analysis by the ACS. This dataset identifies all devices connected to the CPE. The ACS analyses this data as part of a management service (e.g. to identify faults). The dataset collected under the TR-69 protocol identifies each device connected to the hub by its Media Access Control (MAC) address.

In a wireless local area network, a device may connect to the CPE via a repeater. The connection between the CPE and the device may comprise a single repeater or a plurality of repeaters. A repeater may virtualise the MAC address of the device such that the MAC address reported to the CPE by the repeater is a virtualised MAC address instead of the device's actual MAC address. If the device connects to the CPE directly during one time period but connects indirectly via the repeater during a second time period, then the records collected under the TR-69 protocol for the first time period use the device's actual MAC address but the records collected under the TR-69 protocol for the second time period use the device's virtualised MAC address. This results in inferior analysis as the operator is unable to identify all records that relate to that device (and instead erroneously identifies two devices, one having the actual MAC address and one having the virtualised MAC address).

Furthermore, the dataset values may be modified by the repeater such that the values relate to the repeater rather than the device. For example, a signal strength value (such as the Received Signal Strength Indication, RSSI) may be modified such that they represent the RSSI of signals transmitted by the repeater and received by the CPE instead of representing the RSSI of signals transmitted by the device and received by the repeater. This also results in inferior analysis as the operator is unable to correctly assess the signal strength at the device.

SUMMARY OF THE INVENTION

According to a first aspect of the invention, there is provided a method of operating a wireless local area network, the wireless local area network including a user device, a wireless access point and a wireless repeater, wherein the wireless repeater is configured to virtualise a Media Access Control, MAC, address of the user device when the user device is connected to the wireless repeater, the method comprising the steps of: obtaining data including a first plurality of records, wherein each record of the first plurality of records relates to the user device and includes a MAC address and a signal strength value; obtaining data including a second plurality of records, wherein each record of the second plurality of records includes a Basic Service Set Identifier, BSSID, and a signal strength value; for each MAC address in the first plurality of records: identifying a record of the second plurality of records having a BSSID that sufficiently matches the MAC address by determining a similarity between an Organisationally Unique Identifier, OUI, of the BSSID and the OUI of the MAC address, determining that a difference between the signal strength value associated with the identified record of the second plurality of records and the signal strength value associated with the MAC address of the first plurality of records is within a threshold, assigning a first hop repeater identifier to each record of the first plurality of records having the MAC address based on the BSSID of the identified record of the second plurality of records; and causing a reconfiguration in the wireless local area network based on the first hop repeater identifier.

The method may further comprise the step of: determining the signal strength value associated with the identified record of the second plurality of records is as an average of the signal strength values of all records of the second plurality of records having that BSSID.

The method may further comprise the step of: determining a minimum difference between the signal strength value associated with the identified record of the second plurality of records and at least two of a group comprising: a weighted signal strength value based on all signal strength values of all records of the first plurality of records having that MAC address, a minimum signal strength value based on all signal strength values of all records of the first plurality of records having that MAC address, a maximum signal strength value based on all signal strength values of all records of the first plurality of records having that MAC address, and an average signal strength value based on all signal strength values of all records of the first plurality of records having that MAC address, wherein the step of determining that the difference between the signal strength value associated with the identified record of the second plurality of records and the signal strength value associated with the MAC address of the first plurality of records is within a threshold includes determining that the minimum difference between the signal strength value associated with the identified record of the second plurality of records and the signal strength value associated with the MAC address of the first plurality of records is within the threshold.

The step of identifying a record of the second plurality of records having a BSSID that sufficiently matches the MAC address may include identifying a first set of the second plurality of records having a BSSID that sufficiently matches the MAC address, and the method further comprises the step of: determining, for each record of the first set of the second plurality of records, a difference value between the signal strength value associated with that record of the first set of the second plurality of records and the signal strength value associated with the MAC address of the first plurality of records; and identifying the record of the first set of the second plurality of records having the smallest difference value, wherein the step of determining that a difference between the signal strength value associated with the identified record of the second plurality of records and the signal strength value associated with the MAC address of the first plurality of records is within a threshold includes determining that the smallest difference value between the signal strength value associated with the identified record of the first set of the second plurality of records and the signal strength value associated with the MAC address of the first plurality of records is within the threshold, wherein the first hop repeater identifier is based on the BSSID of the identified record of the first set of the second plurality of records.

The step of determining, for each record of the first set of the second plurality of records, a difference value between the signal strength value associated with that record of the first set of the second plurality of records and the signal strength value associated with the MAC address of the first plurality of records may include: determining, for each record of the first set of the second plurality of records, a minimum difference between the signal strength value associated with that record of the second plurality of records and at least two of a group comprising: a weighted signal strength value based on all signal strength values of all records of the first plurality of records having that MAC address, a minimum signal strength value based on all signal strength values of all records of the first plurality of records having that MAC address, a maximum signal strength value based on all signal strength values of all records of the first plurality of records having that MAC address, and an average signal strength value based on all signal strength values of all records of the first plurality of records having that MAC address, wherein the step of identifying the record of the first set of the second plurality of records having the smallest difference value includes identifying the record of the first set of the second plurality of records having the smallest minimum difference value.

Each record of the first plurality of records may include a wireless local area network band and each record of the second plurality of records may include a wireless local network band, the step of assigning the first hop repeater identifier to each record of the first plurality of records having the MAC address may include assigning the first hop repeater identifier to each record of the first plurality of records having the MAC address and a wireless local area network band, and the step of identifying the record of the first set of the second plurality of records having the smallest difference value may include: identifying the record of the first set of the second plurality of records having a wireless local area network band matching the wireless local area network band of each record of the first plurality of records and has the smallest difference value.

Each record of the first plurality of records may include a wireless local area network band and each record of the second plurality of records may include a wireless local network band, the step of assigning the first hop repeater identifier to each record of the first plurality of records having the MAC address may include assigning the first hop repeater identifier to each record of the first plurality of records having the MAC address and wireless local area network band, and the step of identifying the record of the first set of the second plurality of records having the smallest difference value may include: determining that no records of the first set of the second plurality of records has the wireless local area network band matching the wireless local area network band of each record of the first plurality of records, and identifying the record of the first set of the second plurality of records having a wireless local area network band that does not match the wireless local area network band of each record of the first plurality of records and has the smallest difference value.

Each record of the first plurality of records may further include a timestamp, and the weighted signal strength value may be determined as a sum of each signal strength value multiplied by a weight factor across all records of the first plurality of records having that MAC address, wherein the weight factor may be determined as a count of unique timestamp values in a first group of records of the first plurality of records having that MAC address and signal strength value divided by a count of unique timestamp values in a second group of records of the first plurality of records having that MAC address.

The method may further comprise the steps of: assigning a root repeater identifier to each record of the first plurality of records having the MAC address based on the SSID associated with the BSSID of the identified record of the second plurality of records.

The method may further comprise the step of: determining that a single SSID in the second plurality of records is associated with the BSSID of identified record of the second plurality of records, wherein the assignment of the root repeater identifier to each record of the first plurality of records having the MAC address is based on the BSSID of the identified record of the second plurality of records.

The method may further comprise the step of: determining that a second set of the second plurality of records each include the SSID associated with the BSSID of the identified record of the second plurality of records; identifying a record of the second set of the second plurality of records having the greatest signal strength value, wherein the assignment of the root repeater identifier to each record of the first plurality of records having the MAC address is based on the BSSID of the identified record of the second set of het second plurality of records.

According to a second aspect of the invention, there is provided a computer program comprising instructions which, when the program is executed by a computer, cause the computer to carry out the steps of the first aspect of the invention.

According to a third aspect of the invention, there is provided a data processing device comprising a processor adapted to perform the steps of the method of the first aspect of the invention.

BRIEF DESCRIPTION OF THE FIGURES

In order that the present invention may be better understood, embodiments thereof will now be described, by way of example only, with reference to the accompanying drawings in which.

DETAILED DESCRIPTION OF EMBODIMENTS

Figure 1:
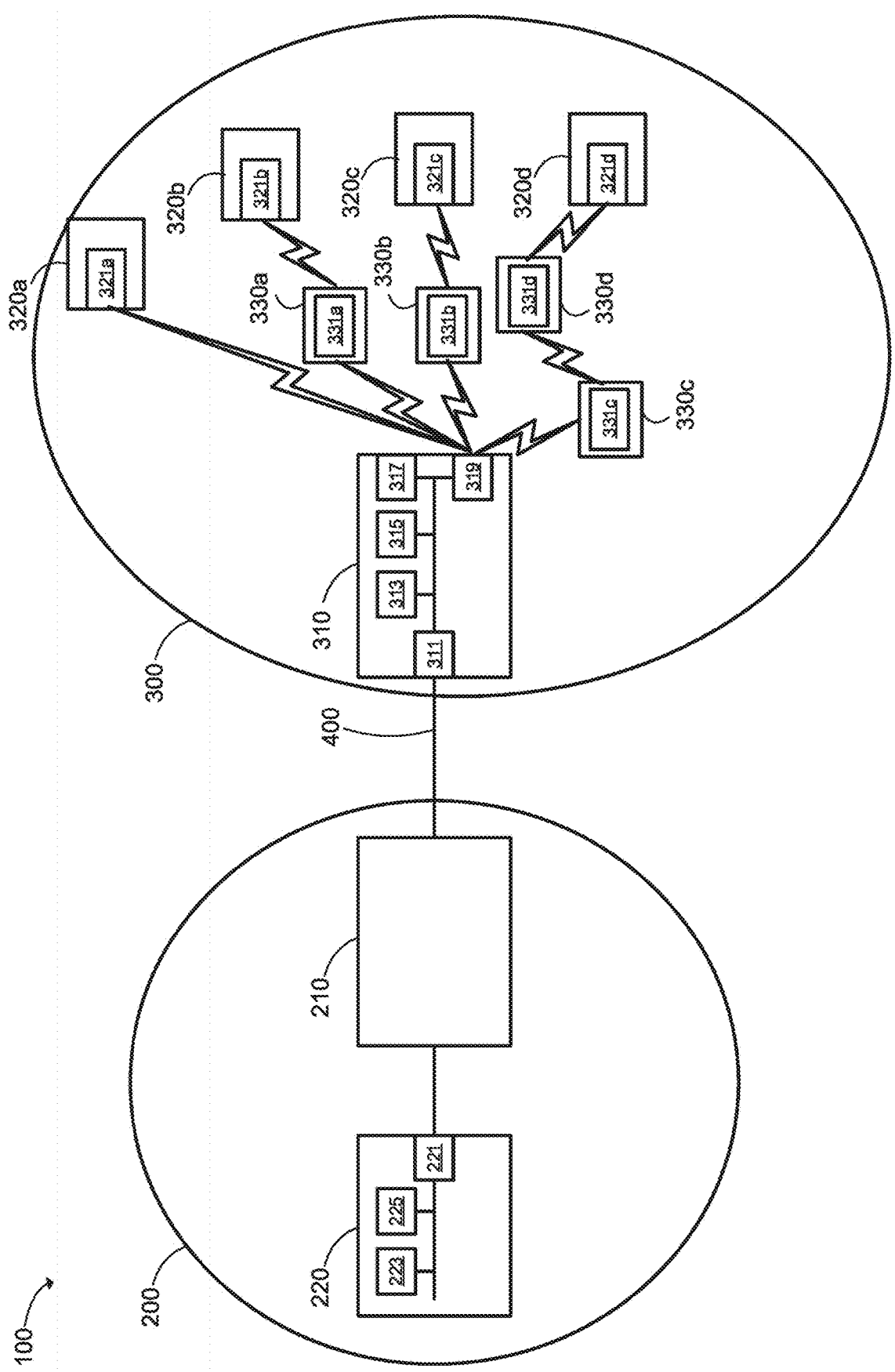
FIG. 1 is a schematic diagram of a telecommunications network of a first embodiment of the present invention.

A first embodiment of a telecommunications network 100 will now be described with reference to FIG. 1. The telecommunications network 100 includes an operator's network 200 and a customer's network 300. The operator's network 200 and customer's network 300 are connected by an access connection 400, which in this embodiment is a Digital Subscriber Line (DSL). The customer's network 300 includes a Customer Premises Equipment (CPE) 310, a plurality of repeaters 330a, 330b, 330c, 330d (collectively 330), and a plurality of user devices 320a, 320b, 320c, 320d (collectively 320).

The CPE 310 includes an access network communications interface 311, a processor 313, memory 315, a wired communications interface 317 and a wireless communications interface 319. The access network communications interface 311 enables the CPE 310 to communicate with the operator's network 200 via the access connection 400. The wired and wireless communications interfaces 317, 319 respectively enable the CPE 310 to provide a wired local area network and a wireless local area network.

In this embodiment the plurality of user devices 320 each include a wireless communications interface 321a, 321b, 321c, 321d (collectively 321) for communicating with the wireless local area network of the CPE 310.

The plurality of repeaters 330 includes a first set of repeaters (the first repeater 330a in FIG. 1) and a second set of repeaters (the second repeater 330b, third repeater 330c, and fourth repeater 330d in FIG. 1). The differences between the first and second sets of the plurality of repeaters 330 are discussed below. Each repeater includes a wireless communications interface 331a, 331b, 331c, 331d (collectively 331) for communicating with the wireless local area network of the CPE 310.

The CPE 310 is identifiable by a Media Access Control (MAC) address for a Network Interface Controller (NIC) associated with its access network communications interface 311. Each user device of the plurality of user devices 320 is identifiable by a MAC address of a NIC associated with its respective communications interface 321. Each repeater of the plurality of repeaters 330 is identifiable by a MAC address of a NIC associated with its respective communications interface 331.

As shown in FIG. 1, the first user device 320a is directly connected to the CPE 310 (that is, the connection is not via one or more repeaters of the plurality of repeaters 330), the second user device 320b is indirectly connected to the CPE 310 via the first repeater 330a of the first set of the plurality of repeaters 330 (that is, it has a single-hop connection to the CPE 310), the third user device 320c is indirectly connected to the CPE 310 via the second repeater 330b of the second set of the plurality of repeaters 330 (similarly, it has a single-hop connection to the CPE 310), and the fourth user device 320d is indirectly connected to the CPE 310 via the third repeater 330c of the second set of the plurality of repeaters 330 and the fourth repeater 330d of the second set of the plurality of repeaters 330 (that is, it has a multi-hop connection to the CPE 310).

In the following description, the term "first hop repeater" is used to identify the repeater between a CPE and user device that is directly connected to the user device. In the single-hop connection scenario for the second user device 320b, the first repeater 330a is the first hop repeater. Similarly, in the single-hop connection scenario for the third user device 320c, the second repeater 330b is the first hop repeater. In the multi-hop connection scenario for the fourth user device 320d, the fourth repeater 330d is the first hop repeater (that is, the third repeater 330c is not a first hop repeater).

Furthermore, in the following description, the term "root repeater" is used to identify the repeater between a CPE 310 and user device 320 that is directly connected to the CPE 310. In the single-hop connection scenario for the second user device 320b, the first repeater 330a is the root repeater. Similarly, in the single-hop connection scenario for the third user device 320c, the second repeater 330b is the root repeater. In the multi-hop connection scenario for the fourth user device 320d, the third repeater 330c is the root repeater (that is, the fourth repeater 330d is not a root repeater).

In this embodiment, each repeater that is a member of the second set of repeaters and is a first hop repeater (that is, the second repeater 330b and fourth repeater 330d of FIG. 1) is configured to virtualise the MAC address of the user device. A MAC address consists of six octets, with the first three octets referred to as the Organisationally Unique Identifier (OUI) and the second three octets being Network Interface Controller (NIC) specific and therefore referred to as the NIC. The second least significant bit of the most significant octet of the MAC address may use value 0 to indicate that it is a globally unique (that is, "Global") MAC address or use value 1 to indicate that it is a locally administered (that is, "Local") MAC address. When a repeater virtualises the MAC address of a user device, the repeater replaces the OUI of the MAC address (being the company identifier of the manufacturer of the user device) with its own OUI (that is, the company identifier of the manufacturer of the repeater), in which the second least significant bit of the most significant octet (of its own OUI) set to 1 such that the second character of the first octet is 2, 6, A or E (e.g. x2:xx:xx:xx:xx:xx, x6:xx:xx:xx:xx:xx, xA:xx:xx:xx:xx:xx, xE:xx:xx:xx:xx:xx).

It is noted that some user devices may already use a local MAC address, such as when those user devices use MAC randomisation. In this scenario, the repeater may still virtualise the MAC address by replacing the OUI part of the MAC address with its own OUI, with the second least significant bit of the most significant octet set to 1 such that the second character of the first octet is 2, 6, A or E.

Furthermore, each repeater that is either a member of the first set of the plurality of repeaters (e.g. the first repeater 330a) and/or a member of the second set of the plurality of repeaters but is not a first hop repeater (e.g. the third repeater 330c in FIG. 1) is not configured to virtualise the MAC address of the user device. In other words, a repeater of the second set of the plurality of repeaters is configured to virtualise the MAC address of a directly connected user device, but is not configured to virtualise the MAC address of a directly connected access point (such as another repeater).

The operator's network 200 includes an access network communications node 210 and a Network Management System (NMS) 220. The access network communications node 210 enables the NMS 220 (and any other node of the operator's network, or any node in an external network connected to the operator's network) to communicate with the CPE 310 via the access connection 400. The NMS 220 includes a communications interface 221, a processor 223 and a memory 225.

Figure 2:
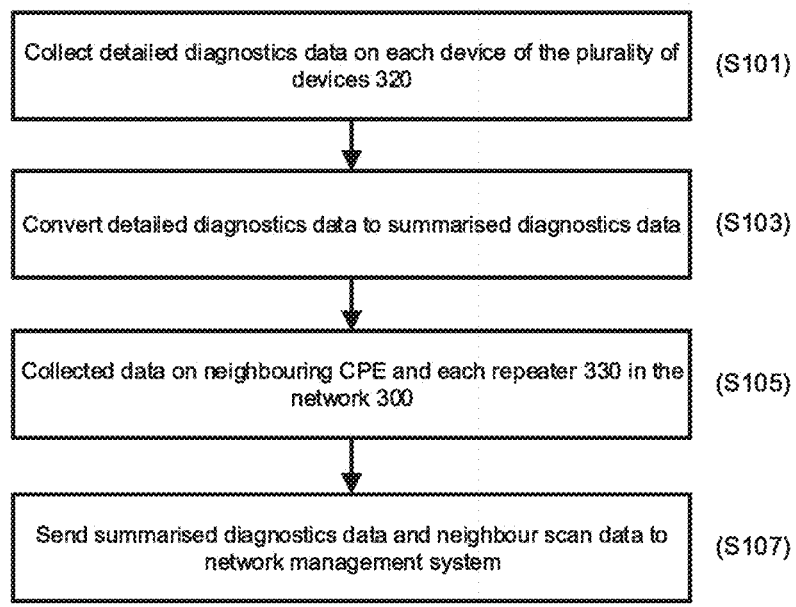
FIG. 2 is a flow diagram illustrating a first process of a method of the first embodiment of the present invention.
Figure 3:
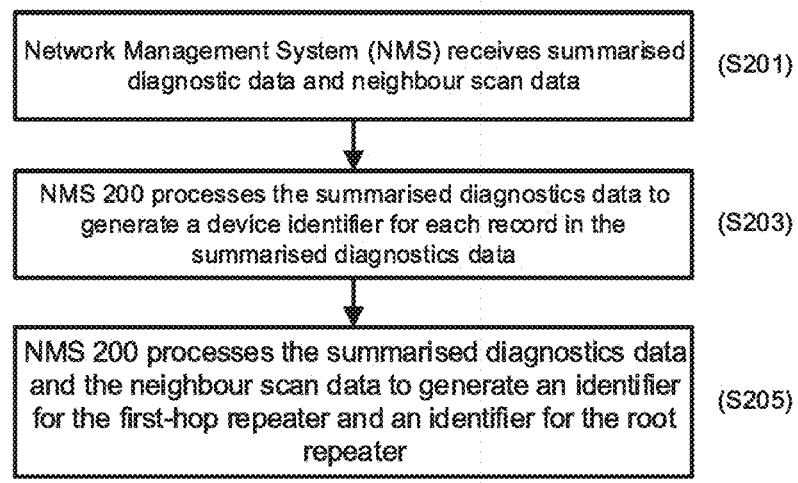
FIG. 3 is a flow diagram illustrating a second process of the method of the first embodiment of the present invention.
Figure 4:
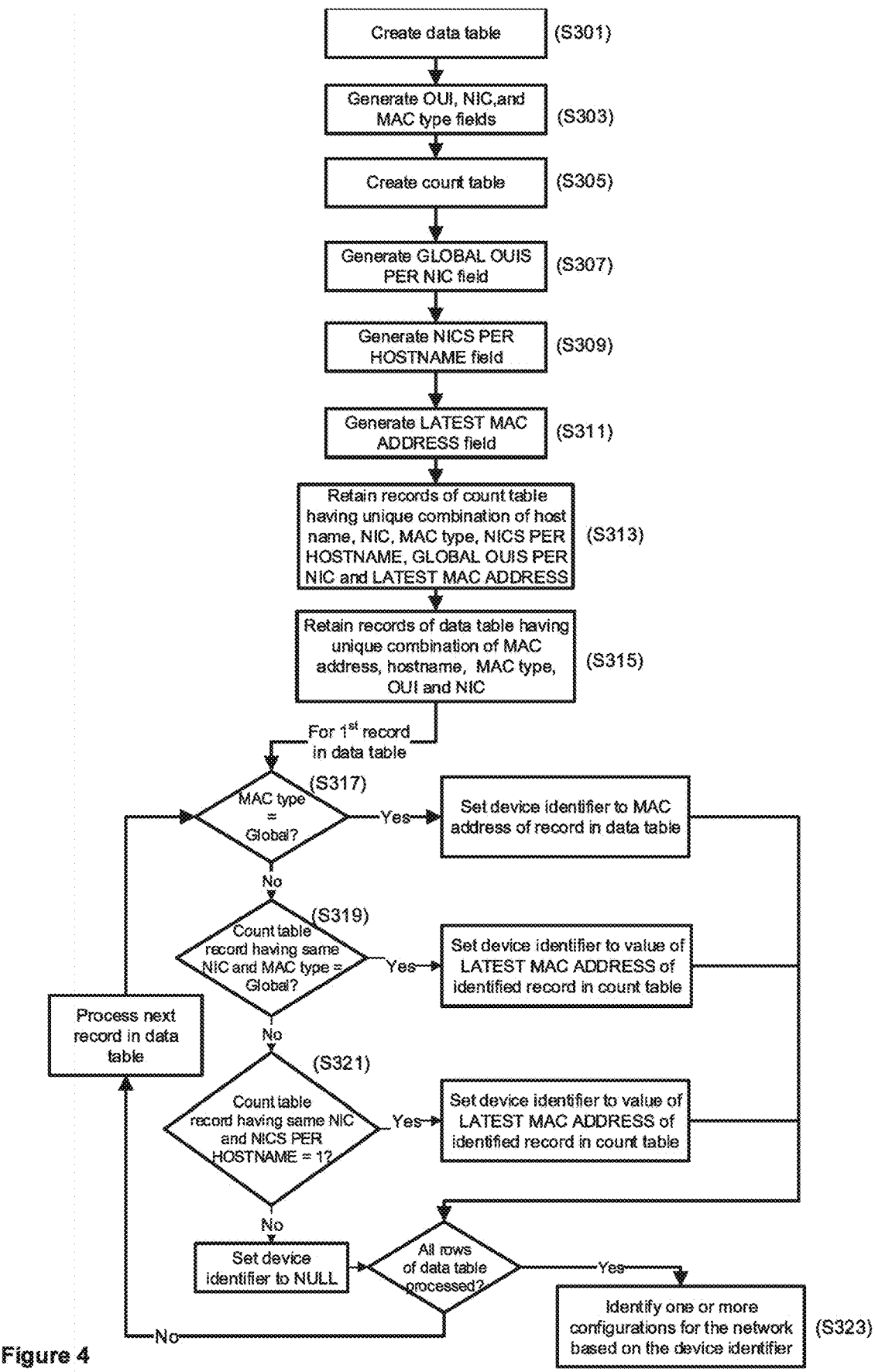
FIG. 4 is a flow diagram illustrating the step of generating the device identifier of the second process of FIG. 3 in more detail.
Figure 5:
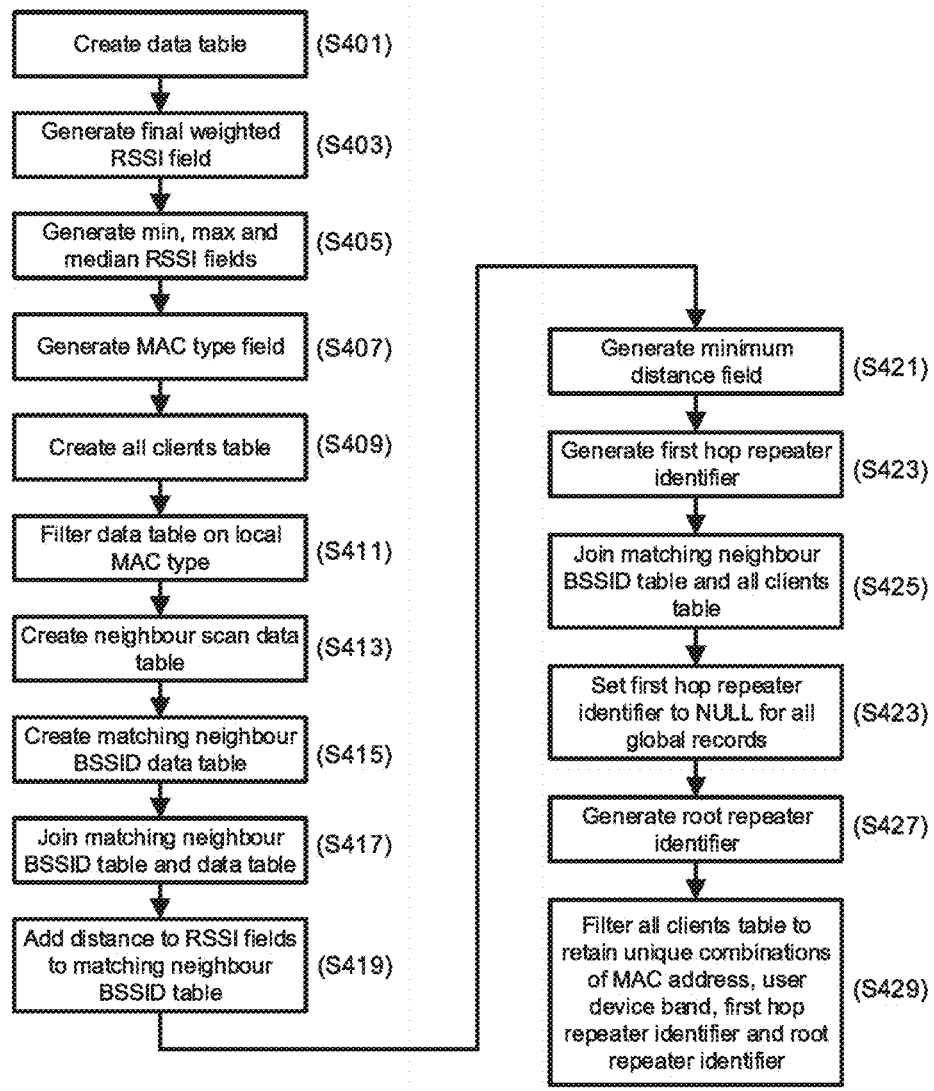
FIG. 5 is a flow diagram illustrating the step of generating the identifier for the first-hop repeater and an identifier for the root repeater of the second process of FIG. 3 in more detail.

A first embodiment of a method of the present invention will now be described with reference to FIGS. 2 to 5. FIG. 2 illustrates steps performed by the CPE 310's processing and memory modules 313 and 315, and FIGS. 3 to 5 illustrate steps performed by the NMS 220's processing and memory modules 223 and 225.

In a first step (S101) of the first process, the CPE's processor 313 implements a first diagnostics function to collect data on each device of the plurality of devices 320. This data is collected periodically and this periodicity may be remotely configured by the network operator (this periodicity may be in a range from a hundred milliseconds to every ten seconds). Each record in the data includes the MAC address of the user device, a timestamp representing the time at which the CPE 310 collected the data, a hostname of the user device, a Wireless Local Area Network (WLAN) channel identifier for the channel used by the user device, and parameters of the user device. These parameters include Received Signal Strength Indicator (RSSI), downlink physical layer (PHY) rate, uplink PHY rate, downlink packet counter values, uplink packet counter values, and a retransmission counter value.

The data collected in the first process is hereinafter referred to as detailed diagnostics data. The detailed diagnostics data is stored in the CPE's memory 315.

In step S103, the CPE's processor 313 implements a compression function to convert the detailed diagnostics data into summarised diagnostics data. The detailed diagnostics data is converted to summarised diagnostics data periodically and this periodicity may be remotely configured by the network operator (this periodicity may be in the range from one minute to 10 minutes). The conversion may be implemented by applying one or more statistical functions to the detailed diagnostics data, such as a summation, average, maximum, or minimum of each parameter of the user device. The summarised diagnostic data is also stored in the CPE's memory 315.

In step S105, the CPE's processor 313 implements a second diagnostics function to collect data on neighbouring CPE (that is, any other CPE from which the CPE 310 receives communication signals). This second diagnostics function also collects data on each repeater in the customer's network 300. Each record in the data includes a timestamp representing the time the CPE 310 collected data for the neighbouring CPE/repeater, a MAC address of the neighbouring CPE/repeater (that is, the Basic Service Set Identifier, BSSID), the advertised Service Set Identifier (SSID) for the neighbouring CPE/repeater, a WLAN channel identifier for the channel used when the CPE 310 detected the neighbouring CPE/repeater, and the RSSI of signals transmitted by the neighbouring CPE/repeater and received at the CPE 310.

The data collected in the second process is hereinafter referred to as the neighbour scan data.

In step S107, the CPE transmits the summarised diagnostic data and the neighbour scan data to the NMS (that is, via the access connection 400). This data may then be deleted from memory 315 in CPE 310. Turning to FIG. 3, in step S201, the NMS 220 receives the summarised diagnostic data and neighbour scan data and stores it in memory 225. Steps S101 to S105 and step S201 are performed periodically such that the NMS 220 collects additional records and adds them to the summarised diagnostic data and neighbour scan data already stored in memory 225. The summarised diagnostic data and neighbour scan data may include data for multiple days.

The NMS 220 may receive the summarised diagnostic data and neighbour scan data from multiple CPEs. These may be stored in the same database by adding an additional identifier for a CPE (e.g. serial number of the CPE) to each record relating to that CPE.

In step S203 of FIG. 3, NMS processor 223 processes the summarised diagnostics data for a particular CPE to generate a device identifier for each record in the summarised diagnostics data, the device identifier uniquely identifying the user device to which the data relates. This step is described in detail below with reference to FIG. 4.

In step S205 of FIG. 3, NMS processor 223 processes the summarised diagnostics data for a particular CPE and the neighbour scan data for a particular CPE to generate an identifier for the first-hop repeater (that is, the only repeater in a single-hop repeater scenario or the repeater that the user device is directly connected to in a multi-hop repeater scenario) and an identifier for the root repeater (that is, the only repeater in a single-hop repeater scenario or the repeater that the CPE is directly connected to in a multi-hop repeater scenario). This step is described in detail below with reference to FIG. 5.

FIG. 4 illustrates the process of generating the device identifier in more detail. In step S301, NMS processor 223 processes the summarised diagnostics data to create a first "data" table for the CPE 310 by filtering the summarised diagnostics data on the serial number for CPE 310 and retrieving the serial number, timestamp, MAC address, and host name fields. The timestamp field represents the time the data was collected by the CPE 310. Table 1 below illustrates example data of the data table.

TABLE 1

Table illustrating example data of the data table

| Record # | Serial Number | Timestamp | Hostname | MAC address |
|---|---|---|---|---|
| 1 | a_home_sn | 2020 Dec. 8 18:49:12 | JD-abfdslgj | OUI_3:NIC_Y |
| 2 | a_home_sn | 2020 Dec. 8 18:49:12 | JD-abfdslgj | OUI_2:NIC_Y |
| 3 | a_home_sn | 2020 Dec. 8 18:49:12 | TL-adflf | OUI_4:NIC_Z |
| 4 | a_home_sn | 2020 Dec. 8 18:53:02 | NULL | OUI_2:NIC_Z |
| 5 | a_home_sn | 2020 Dec. 8 18:53:02 | TL-adflf | OUI_4:NIC_Z |
| 6 | a_home_sn | 2020 Dec. 8 18:57:02 | NULL | OUI_2:NIC_Z |
| 7 | a_home_sn | 2020 Dec. 8 18:57:02 | TL-adflf | OUI_4:NIC_Z |
| 8 | a_home_sn | 2020 Dec. 8 19:01:06 | NULL | OUI_2:NIC_Z |
| 9 | a_home_sn | 2020 Dec. 8 19:01:06 | TL-adflf | OUI_4:NIC_Z |
| 10 | a_home_sn | 2020 Dec. 8 19:05:35 | NULL | OUI_2:NIC_Z |
| 11 | a_home_sn | 2020 Dec. 8 19:05:35 | TL-adflf | OUI_4:NIC_Z |
| 12 | a_home_sn | 2020 Dec. 8 19:13:17 | TL-adflf | OUI_4:NIC_Z |
| 13 | a_home_sn | 2020 Dec. 8 19:21:33 | NULL | OUI_2:NIC_Z |
| 14 | a_home_sn | 2020 Dec. 8 19:37:36 | TL-adflf | OUI_4:NIC_Z |

In step S303, the NMS processor 223 generates and adds the following fields to each record of the data table:
  the OUI of the MAC address, being the first three octets of the MAC address of that record;
  the NIC of the MAC address, being the last three octets of the MAC address of that record; and
  the MAC type, being "Global" if the second character of the OUI of the MAC address of that record is not equal to 2, 6, A or E, and "Local" if the second character of the OUI of the MAC address of that record is equal to 2, 6, A or E.

Table 2, below, illustrates example data of the data table following step S303.

TABLE 2

Table illustrating data from the data table following step S303

| Record # | ... | Timestamp | Hostname | MAC Address | OUI | NIC | MAC Type |
|---|---|---|---|---|---|---|---|
| 1 | ... | 2020 Dec. 8 18:49:12 | JD-abfdslgj | OUI_3:NIC_Y | OUI_3 | NIC_Y | Global |
| 2 | ... | 2020 Dec. 8 18:49:12 | JD-abfdslgj | OUI_2:NIC_Y | OUI_2 | NIC_Y | Local |
| 3 | ... | 2020 Dec. 8 18:49:12 | TL-adflf | OUI_4:NIC_Z | OUI_4 | NIC_Z | Local |
| 4 | ... | 2020 Dec. 8 18:53:02 | NULL | OUI_2:NIC_Z | OUI_2 | NIC_Z | Local |
| 5 | ... | 2020 Dec. 8 18:53:02 | TL-adflf | OUI_4:NIC_Z | OUI_4 | NIC_Z | Local |
| 6 | ... | 2020 Dec. 8 18:57:02 | NULL | OUI_2:NIC_Z | OUI_2 | NIC_Z | Local |
| 7 | ... | 2020 Dec. 8 18:57:02 | TL-adflf | OUI_4:NIC_Z | OUI_4 | NIC_Z | Local |
| 8 | ... | 2020 Dec. 8 19:01:06 | NULL | OUI_2:NIC_Z | OUI_2 | NIC_Z | Local |
| 9 | ... | 2020 Dec. 8 19:01:06 | TL-adflf | OUI_4:NIC_Z | OUI_4 | NIC_Z | Local |
| 10 | ... | 2020 Dec. 8 19:05:35 | NULL | OUI_2:NIC_Z | OUI_2 | NIC_Z | Local |
| 11 | ... | 2020 Dec. 8 19:05:35 | TL-adflf | OUI_4:NIC_Z | OUI_4 | NIC_Z | Local |
| 12 | ... | 2020 Dec. 8 19:13:17 | TL-adflf | OUI_4:NIC_Z | OUI_4 | NIC_Z | Local |
| 13 | ... | 2020 Dec. 8 19:21:33 | NULL | OUI_2:NIC_Z | OUI_2 | NIC_Z | Local |
| 14 | ... | 2020 Dec. 8 19:37:36 | TL-adflf | OUI_4:NIC_Z | OUI_4 | NIC_Z | Local |

In step S305, the NMS processor 223 generates a new table, a "count" table, to store a plurality of counts derived from data in the data table. In step S307, the NMS processor 223 processes the records in the data table to generate and add to the count table a first field ("GLOBAL_OUIS_PER_NIC") representing a count of unique OUIs having a "Global" MAC type for each NIC in the second table. This is achieved by grouping all records in the count table by the NIC field and determining, for each group of records, a count of distinct OUIs of records having a MAC type value of "Global". The possible values for the GLOBAL_OUIS_PER_NIC field are 0 or 1 for these groups of records (as a device would have, at most, one global MAC address).

Applying step S307 to the example data of Table 2, the NMS processor 223 identifies two groups with the following values for GLOBAL_OUIS_PER_NIC:
  Group: NIC=NIC_Y; GLOBAL_OUIS_PER_NIC: 1
  Group: NIC=NIC_Z; GLOBAL_OUIS_PER_NIC: 0.

In step S309, the NMS processor 223 processes the records in the data table to generate and add to the count table a second new field ("NICS_PER_HOSTNAME") representing a count of unique NICs for each hostname in the count table. This is achieved by grouping all records in the data table by the hostname field and determining a count, for each group of records, of distinct NICs.

Applying step S309 to the example data of Table 2, the NMS processor 223 identifies two unique hostnames (NULL hostnames are not processed), and determines the following values for NICS_PER_HOSTNAME:
  Hostname: JD-abfdslgj; NICS_PER_HOSTNAME: 1
  Hostname: TL-adflf; NICS_PER_HOSTNAME: 1

In step S311, the NMS processor 223 processes the records in the data table to generate and add to the count table a third new field ("LATEST_MAC_ADDRESS") representing the most recent MAC address for any record in which the value of the NICS_PER_HOSTNAME field is equal to 1. This is achieved by grouping all records in the count table by the NIC and the NICS_PER_HOSTNAME fields and determining, for each group of records having a value of the NICS_PER_HOSTNAME field equal to 1, the latest MAC address as:
  if the group of records contains at least one record having a MAC type of "Global", then the LATEST_MAC_ADDRESS is the MAC address of the record with MAC type equal to "Global" having the most recent timestamp value;
  if the group of records does not contain any records having a MAC type of "Global", then the LATEST_MAC_ADDRESS is the MAC address of the record with MAC type equal to "Local" having the most recent timestamp value.

Any record in the count table in which the NICS_PER_HOSTNAME is not equal to 1, the value of the LATEST_MAC_ADDRESS field is set to "Not Applicable".

Applying step S311 to the example data of Table 2, the NMS processor 223 identifies two unique combinations of NIC and NICS_PER_HOSTNAME and determines the following values for LATEST_MAC_ADDRESS:
  Group: NIC: NIC_Y, NICS_PER_HOSTNAME: 1; LATEST_MAC_ADDRESS: OUI_3: NIC_Y (that is, the MAC address of the record with MAC type equal to "Global" having the most recent timestamp value)
  Group: NIC: NIC_Z, NICS_PER_HOSTNAME: 1; LATEST_MAC_ADDRESS: OUI_4: NIC_Z (that is, as there are no "Global" MAC addresses using this NIC, the LATEST_MAC_ADDRESS is the MAC address of the record with MAC type equal to "Local" having the most recent timestamp value)

In step S313, the NMS processor 223 processes the records in the count table to retain records having a unique combination of host name, NIC, MAC type, NICS_PER_HOSTNAME, GLOBAL_OUIS_PER_NIC and LATEST_MAC_ADDRESS.

Table 3, below, illustrates example data of the count table following step S313:

TABLE 3

Table illustrating exmple data following step S313.

| Record # | Host Name | NIC | MAC Type | NICS_PER_HOSTNAME | GLOBAL_OUIS_PER_NIC | LATEST_MAC_ADDRESS |
|---|---|---|---|---|---|---|
| 1 | JD-abfdslgj | NIC_Y | Global | 1 | 1 | OUI_3:NIC_Y |
| 2 | JD-abfdslgj | NIC_Y | Local | 1 | 0 | OUI_3:NIC_Y |
| 3 | TL-adflf | NIC_Z | Local | 1 | 0 | OUI_4:NIC_Z |

The NMS processor 223 then processes both the data table and the count table to determine the device identifier for each user device. In step S315, the data table is processed to retrain records having a unique combination of MAC address, hostname, MAC type, OUI and NIC. Table 4, below, illustrates example data of the data table following step S315:

TABLE 4

Table illustrating example data following step S315

| Record # | Hostname | MAC Address | OUI | NIC | MAC Type |
|---|---|---|---|---|---|
| 1 | JD-abfdslgj | OUI_3:NIC_Y | OUI_3 | NIC_Y | Global |
| 2 | JD-abfdslgj | OUI_2:NIC_Y | OUI_2 | NIC_Y | Local |
| 3 | TL-adflf | OUI_4:NIC_Z | OUI_4 | NIC_Z | Local |
| 4 | NULL | OUI_2:NIC_Z | OUI_2 | NIC_Z | Local |

Each record of the data table is then iteratively processed to generate and add to the data table the device identifier for that record. Starting with the first record of the data table, in step S317, the NMS processor 223 processes the first record of the data table to determine whether the MAC type of the first record of the data table is equal to "Global". If so, then the device identifier for the first record of the data table is set to the value of the MAC address field of the first record of the data table. If not, the NMS processor 223 proceeds to step S319.

In step S319, the NMS processor 223 processes the count table to identify a record of the count table having both the value of the NIC field of the first record of the data table and a MAC type field equal to "Global". If a record in the count table is found, then the device identifier for the first record of the data table is set to the value of the LATEST_MAC_ADDRESS associated with the identified record in the count table. If no record in the count table is found, the NMS processor 223 proceeds to step S321.

In step S321, the NMS processor 223 processes the count table to identify a record of the count table having both the value of the NIC field of the first record of the data table, a MAC type field equal to "Local", and a value of the NICS_PER_HOSTNAME field equal to 1. If a record in the count table is found, then the device identifier for the first record of the data table is set to the value of the LATEST_MAC_ADDRESS associated with the identified record in the count table. If no record in the count table is found, then the device identifier for the first record of the data table is set to NULL.

The NMS processor 223 then loops back to step S317 to process the second row in the data table. This iterative process continues until all records in the data table are processed, generating a device identifier for each record in the data table.

Applying this iterative loop of steps S317 to S321 to the data of Table 4, the NMS processor 223 determines that the first record of the data table satisfies the condition of step S317 (that is, the MAC type of the first record is equal to "Global") and the device identifier for the first record is therefore set to the value of the MAC address field of the first record—OUI_3: NIC_Y. The NMS processor 223 then processes the second record of the data table and determines that the second record does not satisfy the condition of step S317 but does satisfy the condition of step S319 (that is, record 1 of the count table—as shown in Table 3—has a matching NIC value and has MAC type="Global"), and the device identifier is therefore set to the value of the LATEST_MAC_ADDRESS field for record 1 of the count table—OUI_3: NIC_Y. The NMS processor 223 then processes the third record of the data table and determines that the third record does not satisfy the conditions of steps S317 and S319 but does satisfy the condition of step S321 (that is, record 3 of the count table—as shown in Table 3—has a matching NIC value, has MAC type="Local", and a value of NICS_PER_HOSTNAME equal to 1), and the device identifier is therefore set to the value of the LATEST_MAC_ADDRESS for record 3 of the count table—OUI_4: NIC_Z. The NMS processor 223 then processes the fourth record of the data table and determines that the fourth record does not satisfy the conditions of steps S317 and S319 but does satisfy the condition of step S321 (that is, record 3 of the count table—as shown in Table 3—has a matching NIC value, has MAC type="Local", and a value of NICS_PER_HOSTNAME equal to 1), and the device identifier is therefore set to the value of the LATEST_MAC_ADDRESS for record 3 of the count table—OUI_4: NIC_Z.

Table 5, below, illustrates example data following these iterative steps:

TABLE 5

Table illustrating example data following iterative steps S317 to S321

| Record # | Hostname | MAC Address | OUI | NIC | MAC Type | Band | Device Identifier |
|---|---|---|---|---|---|---|---|
| 1 | JD-abfdslgj | OUI_3:NIC_Y | OUI_3 | NIC_Y | Global | 5 GHz | OUI_3:NIC_Y |
| 2 | JD-abfdslgj | OUI_2:NIC_Y | OUI_2 | NIC_Y | Local | 2.4 GHz | OUI_3:NIC_Y |

TABLE 5-continued

Table illustrating example data following iterative steps S317 to S321

| Record # | Hostname | MAC Address | OUI | NIC | MAC Type | Band | Device Identifier |
|---|---|---|---|---|---|---|---|
| 3 | TL-adflf | OUI_4:NIC_Z | OUI_4 | NIC_Z | Local | 2.4 GHz | OUI_4:NIC_Z |
| 4 | NULL | OUI_2:NIC_Z | OUI_2 | NIC_Z | Local | 2.4 GHz | OUI_4:NIC_Z |

These device identifiers may then be used, by NMS processor 223, to identify all records in the summarised diagnostics data that relate to the same device by performing a lookup on the MAC address of each record in the summarised diagnostics data to retrieve the corresponding device identifier associated with that MAC address in the data table. The summarised diagnostics data may then be grouped by the device identifier to identify all records that relate to the same device. This first process of the present invention therefore enables all records relating to the same user device to be identified in the summarised diagnostics data, even when the MAC addresses for those records are not the same due to the MAC address being virtualised by a repeater 330. For example, all records using either OUI_3: NIC_Y or OUI_2: NIC_Y as their MAC address may be grouped together by the unique device identifier OUI_3: NIC_Y (following a lookup of rows 1 and 2 of Table 5), and all records using OUI_4: NIC_Z or OUI_2: NIC_Z as their MAC address may be grouped together by the unique device identifier OUI_4: NIC_Z (following a lookup of rows 3 and 4 of Table 5).

The NMS processor 223 may then process these records having a common device identifier to determine one or more key performance indicators, such as the total time spent by the user device using a WLAN connection. In a scenario in which the user device is connected to the CPE 310 directly during a first time period and connected to the CPE 310 indirectly via the second repeater 330b during a second time period, then the NMS processor 223 would identify records for these two time periods as having a common device identifier and would therefore calculate the total time spent as the sum of the durations of the first and second time periods. In contrast, if the original MAC address of the user device was used for the calculation of the total time spent (and the second repeater 220b virtualised the MAC address during the second time period), then NMS processor 223 would erroneously identify a first user device with a total time spent value equal to the duration of the first time period and a second user device with a total time spent value equal to the duration of the second time period. By correctly evaluating the total time spent connected via the WLAN connection, the user device may be given a higher priority when performing troubleshooting or diagnostics on the WLAN.

In step S323, the NMS processor 223 identifies one or more configurations for the network by analysing records in the data table grouped by the unique device identifier. These reconfigurations may be, for example, updating Quality of Service (QOS) parameters for the most active set of devices (that is, those having the greatest "total active time" value), and/or updating steering policies for the most active set of devices.

In the above first process, the NMS processor 223 identifies a unique device identifier for each user device by determining whether a) the MAC address is a "Global" MAC address, b) the MAC address is a "Local" MAC address but there is a "Global" MAC address having the same NIC value, or c) the MAC address is a "Local" MAC address but its NIC value is the only NIC value associated with a particular non-empty hostname.

The first condition (i.e. the MAC address is a "Global" MAC address) enables the user device to be uniquely identified as this indicates that the user device's MAC address is globally unique and has not been virtualised. This first condition is also indicative of the user device connecting directly to the CPE 310 or indirectly exclusively via one or more repeaters of the first set of the plurality of repeaters 330 (which are not configured to modify the MAC address of the user device), and therefore not connecting via one or more repeaters of the second set of the plurality of repeaters 330. The second condition (the MAC address is a "Local" MAC address but there is a "Global" MAC address having the same NIC value) enables the user device to be uniquely identified as the NIC value is unchanged during the virtualisation process, such that the user device uses the "Global" MAC address when connecting to the CPE 310 directly or indirectly exclusively via one or more repeaters of the first set of the plurality of repeaters 330, but uses the "Local" MAC address when connecting to the CPE 310 indirectly via one or more repeaters of the second set of the plurality of repeaters 330, in which the OUI part of these "Global" and "Local" MAC addresses are different but the NIC part of these "Global" and "Local" MAC addresses are the same. Accordingly, if there is a matching "Global" MAC address having the same NIC value, then this may be used to uniquely identify the user device. The third condition (the MAC address is a "Local" MAC address but its NIC value is the only NIC value associated with a particular hostname) enables the user device to be uniquely identified as the hostname is sufficiently unique and there is a unique association between the NIC value and that hostname.

The skilled person will understand that the NMS processor 223 may implement the three conditions above in any combination that includes at least one of the second and third conditions (including one condition of the three conditions, two of the three conditions, or all three of the conditions) and in any order. Applying all three conditions gives the greatest chance of uniquely identifying the user device.

The skilled person will understand that the first process may be applied when a user device is identified by another form of persistent device label, such as a server name or fully qualified domain name.

FIG. 5 illustrates the steps of generating an identifier for the first-hop repeater (that is, the only repeater in a single-hop repeater scenario or the repeater that the user device is directly connected to in a multi-hop repeater scenario) and an identifier for the root repeater (that is, the only repeater in a single-hop repeater scenario or the repeater that the CPE is directly connected to in a multi-hop repeater scenario) in more detail.

In step S401, NMS processor 223 processes the summarised diagnostics data to create a first "data" table for the CPE 310 by filtering the summarised diagnostics data on the serial number for CPE 310 and retrieving the MAC address, channel, timestamp and RSSI fields. The channel field is an identifier for the WLAN channel used by the user device, and the timestamp field represents the time the data was collected by the CPE 310. The channel field is converted to a band field, "user device band", being one of "2.4 GHz" or "5 GHz", based on the channel field value. The term "user device band" is used to differentiate it from the band field derived from the neighbour scan data. However, as noted above, the summarised diagnostic data may actually relate to the repeater when the repeater is one of the second set of the plurality of repeaters.

In step S403, the NMS processor 223 processes the records of the data table to generate and add a first new field, In step S409, the NMS processor 223 generates a further table, the all clients table, based on the data table as processed in step S407. The all clients table includes a list of all unique combinations of MAC address, user device band and MAC type in the data table. The all clients table is used later in this second process.

In step S411, the NMS processor 223 filters the data table on the MAC type field to retain records having a "local" MAC type.

An example of the data table following step S411 is shown in Table 6 below:

TABLE 6

Table illustrating example data of the data table following step S411

| Record # | MAC Address | User device band | final_weighted_rssi | min_rssi | max_rssi | med_rssi | MAC Type |
|---|---|---|---|---|---|---|---|
| 1 | MAC6 | 2.4 GHz | −58.74893617 | −63 | −48 | −59 | local |
| 2 | MAC7 | 2.4 GHz | −58.71600418 | −64 | −48 | −59 | local |
| 3 | MAC8 | 2.4 GHz | −75.46922025 | −82 | −52 | −75 | local |
| 4 | MAC8 | 5 GHz | −69.65948718 | −87 | −53 | −66 | local |
| 5 | MAC9 | 2.4 GHz | −72.14122137 | −85 | −54 | −72 | local |
| 6 | MAC9 | 5 GHz | −61.20738413 | −87 | −37 | −58 | local |
| 7 | MAC13 | 2.4 GHz | −60.63865546 | −88 | −52 | −59 | local |
| 8 | MAC13 | 5 GHz | −69.56666667 | −87 | −55 | −69 | local |
| 9 | MAC14 | 2.4 GHz | −77.25249169 | −85 | −69 | −78 | local |
| 10 | MAC14 | 5 GHz | −76.57394844 | −87 | −55 | −79 | local |
| 11 | MAC15 | 2.4 GHz | −68 | −70 | −65 | −68.5 | local |
| 12 | MAC15 | 5 GHz | −79.75 | −83 | −76 | −80.5 | local | final weighted RSSI, representing a weighted RSSI for each unique combination of MAC address and user device band. This is achieved by:

1. Grouping the records by MAC address, user device band and RSSI and determining, for each group, a count of distinct timestamp field values;
2. Grouping the records by MAC address and user device band and determining, for each group, a count of distinct timestamp field values;
3. Determining a weighted RSSI for each combination of MAC address and user device band by dividing the count of step 1 for that group by the count of step 2 for that group, and
4. Grouping the records by MAC address and user device band and determining a final weighted RSSI for each unique combination of MAC address and user device band as the sum of the weighted RSSI value determined in step 3 multiplied by the corresponding RSSI value for the group.

In step S405, the NMS processor 223 processes the records of the data table to generate and add three new fields, minimum RSSI, maximum RSSI and median RSSI. These are generated by grouping the records of the data table by MAC address and user device band and applying suitable minimum, maximum and median functions to the RSSI field values in each group (although any form of averaging function may be applied instead of the median function).

In step S407, the NMS processor 223 processes the records of the data table to generate and add a further new field, MAC type, being "Global" if the second character of the OUI of the MAC address of that record is not equal to 2, 6, A or E, and "Local" if the second character of the OUI of the MAC address of that record is equal to 2, 6, A or E.

In step S413, the NMS processor 223 processes the neighbour scan data to create a "neighbour scan data" table by retrieving the neighbour BSSID, neighbour SSID, neighbour channel, and neighbour RSSI fields. The neighbour channel field is converted to a neighbour band field being one of "2.4 GHz" or "5 GHz", based on the neighbour channel field value. The NMS processor 223 then processes the neighbour scan data table to generate and add a new field, mean neighbour RSSI, for each combination of neighbour BSSID and neighbour band. This is achieved by grouping all records in the neighbour scan data table by neighbour BSSID and neighbour band, and applying a mean function to all RSSI values in that group (although any form of averaging function may be used instead).

In step S415, the NMS processor 223 processes both the data table and the neighbour scan data table to create a new table, a matching neighbour BSSIDs table, associating each unique MAC address in the data table with zero, one or more neighbour BSSIDs of the neighbour scan data table that sufficiently match the unique MAC address. This is achieved by identifying each unique MAC address in the data table and, for each unique MAC address, determining a bit difference between the OUI of the MAC address and the OUI of each neighbour BSSID. The bit difference is determined by converting the OUI of the MAC address to a 24-bit binary value, converting the OUI of the neighbour BSSID to a 24-bit binary value, and applying a suitable bit difference calculation function (such as an XOR gate operator) to the converted OUI values. The MAC address and neighbour BSSID are deemed to sufficiently match if the bit difference is less than or equal to a threshold. In this embodiment, the bit difference threshold is set to 5 (although a threshold of 6 is also possible).

An example of the matching neighbour BSSIDs table, in which MAC13 is matched with MAC16, MAC17, MAC18, MAC19 and MAC20, is shown in Table 7:

TABLE 7

Table illustrating data of the matching neighbour BSSID table following step S415

| Record # | MAC address | User device band | Neighbour BSSID | Neighbour_Band | Neighbour_SSID | mean_Neighbour_RSSI |
|---|---|---|---|---|---|---|
| 1 | MAC13 | 2.4 GHz | MAC16 | 5 GHz | NA | −82 |
| 2 | MAC13 | 2.4 GHz | MAC17 | 5 GHz | SSID1 | −81 |
| 3 | MAC13 | 2.4 GHz | MAC18 | 5 GHz | SSID2 | −80 |
| 4 | MAC13 | 2.4 GHz | MAC19 | 5 GHz | SSID3 | −80 |
| 5 | MAC13 | 2.4 GHz | MAC20 | 2.4 GHz | SSID3 | −71 |
| 6 | MAC13 | 5 GHz | MAC16 | 5 GHz | NA | −82 |
| 7 | MAC13 | 5 GHz | MAC17 | 5 GHz | SSID1 | −81 |
| 8 | MAC13 | 5 GHz | MAC18 | 5 GHz | SSID2 | −80 |
| 9 | MAC13 | 5 GHz | MAC19 | 5 GHz | SSID3 | −80 |
| 10 | MAC13 | 5 GHz | MAC20 | 2.4 GHz | SSID3 | −71 |

Once the list of matching neighbour SSIDs are identified for each unique MAC address, in step S417, the NMS processor 223 joins the matching neighbour BSSID table and the data table on the MAC address and user device band fields. In other words, the final weighted RSSI, minimum RSSI, maximum RSSI, median RSSI and MAC type fields from the data table are added to the matching neighbour BSSID table for each combination of MAC address and user device band.

In step S419, the NMS processor 223 processes the records of the matching neighbour BSSID table to generate and add four new fields, distance to final weighted RSSI, distance to minimum RSSI, distance to maximum RSSI, and distance to median RSSI. These are generated by subtracting the mean neighbour RSSI field value of each record from each of the final weighted RSSI, minimum RSSI, maximum RSSI and median RSSI field values for that record.

In step S421, the NMS processor 223 generates and adds to the matching neighbour BSSID table a new field, minimum distance, having a value equal to the minimum value of the four fields generated in step S419 (that is, the distance to final weighted RSSI, distance to minimum RSSI, distance to maximum RSSI, and distance to median RSSI fields).

Table 8, below, illustrates example data following step S421:

TABLE 8

Table illustrating the matching neighbour BSSID table following step S421

| Record # | MAC address | User device band | Neighbour BSSID | Neighbour_Band | ... | Minimum distance |
|---|---|---|---|---|---|---|
| 1 | MAC13 | 2.4 GHz | MAC16 | 5 GHz | ... | 5 |
| 2 | MAC13 | 2.4 GHz | MAC17 | 5 GHz | ... | 7 |
| 3 | MAC13 | 2.4 GHz | MAC18 | 5 GHz | ... | 8 |
| 4 | MAC13 | 2.4 GHz | MAC19 | 5 GHz | ... | 8 |
| 5 | MAC13 | 2.4 GHz | MAC20 | 2.4 GHz | ... | 10.36134454 |
| 6 | MAC13 | 5 GHz | MAC16 | 5 GHz | ... | 5 |
| 7 | MAC13 | 5 GHz | MAC17 | 5 GHz | ... | 6 |
| 8 | MAC13 | 5 GHz | MAC18 | 5 GHz | ... | 7 |
| 9 | MAC13 | 5 GHz | MAC19 | 5 GHz | ... | 7 |
| 10 | MAC13 | 5 GHz | MAC20 | 2.4 GHz | ... | 1.433333333 |

In step S423, the NMS processor 223 generates and adds to the matching neighbour BSSID table a first hop repeater identifier field for each MAC address. This is achieved by grouping all records in the matching neighbour BSSID table by MAC address and:

identifying one or more records in that group in which the neighbour band field value of that record is equal to the user device band field value of that record. The value of the first hop repeater identifier field is set to the value of the neighbour BSSID field for the record of these one or more records having the smallest value for the minimum distance field that satisfies a minimum distance threshold. If no records exist in the group (that is, there are no records in which the neighbour band field value of that record is equal to the user device band field value of that record, or there are one or more such records but the minimum distance field values of these one or more records do not satisfy the minimum distance threshold), then identify one or more records in the group in which the neighbour band field value of that record is not equal to the user device band field value of that record. The value of the first hop repeater identifier field is set to the value of the neighbour BSSID field for the record of these one or more records having the smallest value for the minimum distance field that satisfies the minimum distance threshold. If no records exist in the matching neighbour BSSID table (that is, there are no records in which the neighbour band field value of that record is not equal to the user device band field value of that record, or there are one or more such records but the minimum distance field values of these one or more records do not satisfy the minimum distance threshold), then the first hop repeater identifier is set to NULL.

In this embodiment, the minimum distance threshold is set to 10 (although the threshold may be in the range of 8 to 12).

Applying step S421 to the example illustrated above, the NMS processor 223 identifies a group of records in which the MAC address field value is MAC13, determines that there are five records within that group in which the neighbour band field value is equal to the user device band field for each record (that is, record 5 of Table 8 in which the user device band field value is 2.4 GHz and the neighbour band field value is 2.4 GHz, and records 6 to 9 of Table 8 in which the user device band field value is 5 GHz and the neighbour band field value is 5 GHz), and that the neighbour BSSID field value of the record within these five records having the smallest minimum distance that satisfies the minimum distance threshold (that is, record 6 of Table 8) is MAC16. The first hop repeater identifier is set to MAC16 for each record of the group of records.

Table 9, below, illustrates example data of the matching neighbour BSSID table following step S421.

TABLE 9

Table illustrating example data of the matching neighbour BSSID table following step S421

| Record # | MAC address | User device band | Neighbour BSSID | Neighbour_Band | ... | Repeater Identifier |
|---|---|---|---|---|---|---|
| 1 | MAC13 | 2.4 GHz | MAC16 | 5 GHz | ... | MAC16 |
| 2 | MAC13 | 2.4 GHz | MAC17 | 5 GHz | ... | MAC16 |
| 3 | MAC13 | 2.4 GHz | MAC18 | 5 GHz | ... | MAC16 |
| 4 | MAC13 | 2.4 GHz | MAC19 | 5 GHz | ... | MAC16 |
| 5 | MAC13 | 2.4 GHz | MAC20 | 2.4 GHz | ... | MAC16 |
| 6 | MAC13 | 5 GHz | MAC16 | 5 GHz | ... | MAC16 |
| 7 | MAC13 | 5 GHz | MAC17 | 5 GHz | ... | MAC16 |
| 8 | MAC13 | 5 GHz | MAC18 | 5 GHz | ... | MAC16 |
| 9 | MAC13 | 5 GHz | MAC19 | 5 GHz | ... | MAC16 |
| 10 | MAC13 | 5 GHz | MAC20 | 2.4 GHz | ... | MAC16 |

In step S423, the NMS processor 223 joins the all client table (generated in step S409 above) and the matching neighbour BSSID table on the MAC address and user device band fields. This is performed as an outer join so all records from the all client table are retained and joined with the fields of the matching neighbour BSSID table.

In step S425, the NMS processor 223 sets a NULL value for the first hop repeater identifier for all records of the all client table in which the value of the MAC type field is "Global".

Steps S401 to S425 above enable the NMS to identify the first hop repeater associated with each user device in the network. This is achieved by an analysis of both the summarised diagnostic data table (in which the MAC address of a user device is virtualised so as to use the OUI of the repeater) and the neighbour scan data (which identifies the BSSID of each repeater). Firstly, by matching the OUIs of the MAC addresses from the summarised diagnostic data (virtualised so as to include the OUI of the repeater) with the OUIs of the BSSIDs of the neighbour scan data, a set of candidate repeaters are identified. A further property of the repeater—that it replaces the user device's RSSI value with its own RSSI value—is then exploited to identify one of these candidates as the first hop repeater by identifying the BSSID having the smallest difference in RSSI to the RSSI values for the corresponding MAC address in the summarised diagnostic data.

In the above embodiment, a single value for the RSSI (mean RSSI) is generated for the neighbour scan data whilst a plurality of values for the RSSI (minimum RSSI, maximum RSSI and median RSSI) are generated for the summarised diagnostic data. This is because there are relatively more records for the summarised diagnostic data than the neighbour scan data, so it is more accurate to compare a single value for the neighbour scan RSSI to a range of values for the summarised diagnostic data RSSI.

In step S427, the NMS processor 223 determines a root repeater identifier for each record in the all client table. This is determined as:
  If the first hop repeater identifier is NULL and the value of the MAC type field is "Global", then the root repeater identifier is set to the MAC address of the CPE 310;
  If the first hop repeater identifier is NULL and the value of the MAC type field is "Local", then the root repeater identifier is set to NULL;
  If the first hop repeater identifier is not NULL, then the root repeater identifier is determined by:
    grouping all records by the value of the neighbour SSID field,
    identifying, for each group, a record having the highest value for its mean neighbour RSSI field, and
    setting the root repeater identifier to the value of the first hop repeater identifier field of the identified record.

The neighbour SSID field is used for grouping the records in the above embodiment as, in most home networks where a plurality of repeaters are used (such as when using a mesh wireless local area network), the repeaters would use the same SSID but different BSSIDs.

In step S429, the NMS processor 223 filters the all clients table to retain all unique combinations of MAC address, user device band, first hop repeater identifier and root repeater identifier. The NMS processor 223 may then process these records of the all clients table as part of a diagnostics process, such as:
  improved CPE/repeater coverage maps for the user's network. That is, without the first hop repeater identifier and root repeater identifier, it would not be possible to identify coverage holes and bandwidth bottlenecks in a user's network that are caused by the repeaters. By correlating the summarised diagnostics data with the all clients table, it is possible to identify any repeaters causing such coverage holes and bandwidth bottlenecks; and
  improved accuracy of an estimate of a reduction in bandwidth for a user device when the user device is connected by one or more repeaters.

In response, an operator may initiate a new configuration in the network. This may involve replacing one or more of the repeaters of the second set of the plurality of repeaters (that modify the MAC address of the user device) with repeaters of the first set of the plurality of repeaters (that do not modify the MAC address of the user device).

In the second process, a matching BSSID is determined by evaluating the bit difference between the OUI of the MAC address and the OUI of the BSSID. However, the similarity between the OUI of the MAC address and the OUI of the BSSID may be determined in other ways, such as by the sum of the numeric difference between the three octets of the OUIs.

Figure 6:
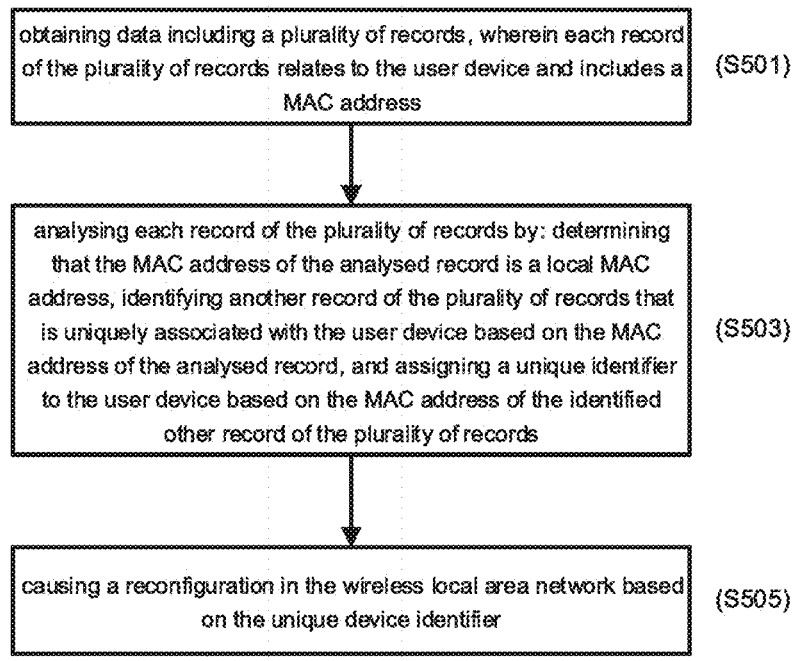
FIG. 6 is a flow diagram providing a further illustration of the step of generating the device identifier of the second process of FIG. 3.

FIG. 6 is a flow diagram providing a further illustration of the first process of the first embodiment of the invention including the steps of: obtaining (S501) data including a plurality of records, wherein each record of the plurality of records relates to the user device and includes a MAC address; analysing (S503) each record of the plurality of records by: determining that the MAC address of the analysed record a local MAC address, identifying another record of the plurality of records that is uniquely associated with the user device based on the MAC address of the analysed record, and assigning a unique identifier to the user device based on the MAC address of the identified other record of the plurality of records; and causing (S505) a reconfiguration in the wireless local area network based on the unique device identifier.

Figure 7:
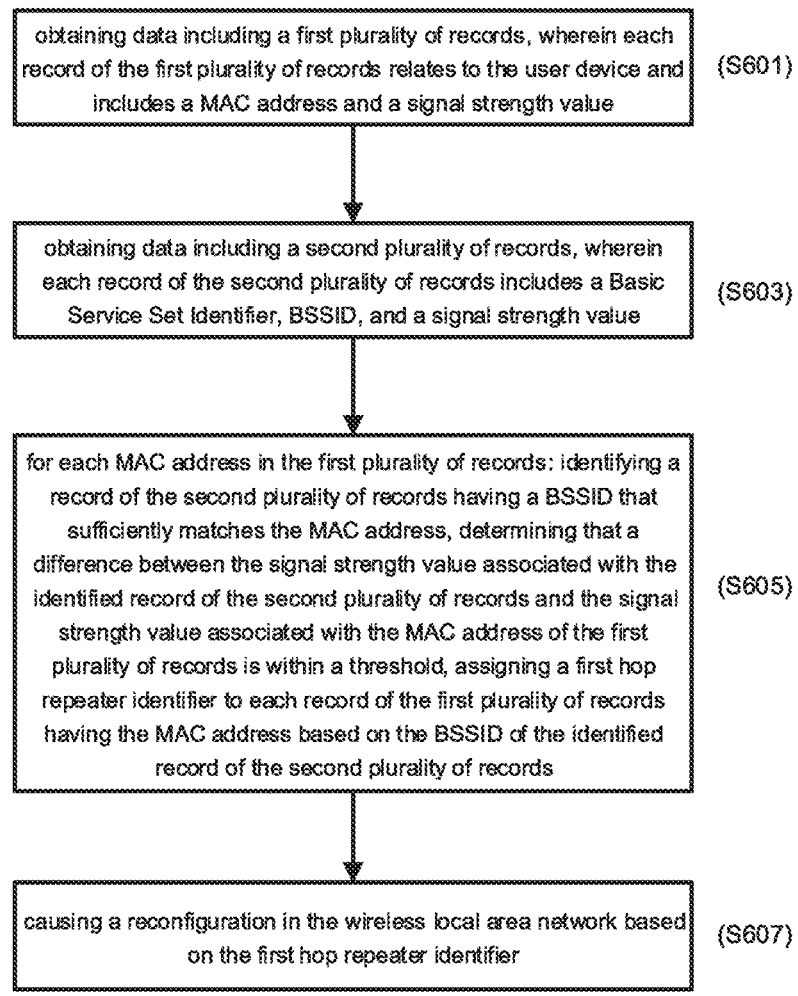
FIG. 7 is a flow diagram providing a further illustration of generating the identifier for the first-hop repeater and an identifier for the root repeater of the second process of FIG. 3.

FIG. 7 is a flow diagram providing a further illustration of the second process of the first embodiment of the invention including the steps of: obtaining (S601) data including a first plurality of records, wherein each record of the first plurality of records relates to the user device and includes a MAC address and a signal strength value; obtaining (S603) data including a second plurality of records, wherein each record of the second plurality of records includes a Basic Service Set Identifier, BSSID, and a signal strength value; for each MAC address in the first plurality of records: identifying (S605) a record of the second plurality of records having a BSSID that sufficiently matches the MAC address, determining that a difference between the signal strength value associated with the identified record of the second plurality of records and the signal strength value associated with the MAC address of the first plurality of records is within a threshold, assigning a first hop repeater identifier to each record of the first plurality of records having the MAC address based on the BSSID of the identified record of the second plurality of records; and causing (S607) a reconfiguration in the wireless local area network based on the first hop repeater identifier.

The skilled person will understand that it is non-essential that the embodiments of the method described above are performed in an NMS. These embodiments may be carried out in any other network node, including those of the network operator's network, an external network, or in the local network (including at the CPE).

The skilled person will understand that any combination of features is possible within het scope of the invention, as claimed.

The invention claimed is:

1. A method of operating a wireless local area network, the wireless local area network including a user device, a wireless access point and a wireless repeater, wherein the wireless repeater is configured to virtualise a Media Access Control (MAC) address of the user device when the user device is connected to the wireless repeater, the method comprising the steps of:
  obtaining data including a first plurality of records, wherein each record of the first plurality of records relates to the user device and includes a MAC address and a signal strength value;
  obtaining data including a second plurality of records, wherein each record of the second plurality of records includes a Basic Service Set Identifier (BSSID) and a signal strength value;
  for each MAC address in the first plurality of records:
    identifying a record of the second plurality of records having a BSSID that sufficiently matches the MAC address by determining a similarity between an Organisationally Unique Identifier (OUI) of the BSSID and the OUI of the MAC address,
    determining that a difference between the signal strength value associated with the identified record of the second plurality of records and the signal strength value associated with the MAC address of the first plurality of records is within a threshold, and
    assigning a first hop repeater identifier to each record of the first plurality of records having the MAC address based on the BSSID of the identified record of the second plurality of records; and
  causing a reconfiguration in the wireless local area network based on the first hop repeater identifier.

2. A method as claimed in claim 1, wherein the similarity between the OUI of the BSSID and the OUI of the MAC address is based on a bit difference between a binary value of the OUI of the BSSID and a binary value of the OUI of the MAC address.

3. A method as claimed in claim 1, further comprising the step of:
  determining the signal strength value associated with the identified record of the second plurality of records is as an average of the signal strength values of all records of the second plurality of records having that BSSID.

4. A method as claimed in claim 1, further comprising the step of:
  determining a minimum difference between the signal strength value associated with the identified record of the second plurality of records and at least two of a group comprising:
    a weighted signal strength value based on all signal strength values of all records of the first plurality of records having that MAC address,
    a minimum signal strength value based on all signal strength values of all records of the first plurality of records having that MAC address,
    a maximum signal strength value based on all signal strength values of all records of the first plurality of records having that MAC address, and
    an average signal strength value based on all signal strength values of all records of the first plurality of records having that MAC address,
  wherein the step of determining that the difference between the signal strength value associated with the identified record of the second plurality of records and the signal strength value associated with the MAC address of the first plurality of records is within a threshold includes determining that the minimum difference between the signal strength value associated with the identified record of the second plurality of records and the signal strength value associated with the MAC address of the first plurality of records is within the threshold.

5. A method as claimed in claim 4, wherein each record of the first plurality of records further includes a timestamp, and the weighted signal strength value is determined as a sum of each signal strength value multiplied by a weight factor across all records of the first plurality of records having that MAC address, wherein the weight factor is determined as a count of unique timestamp values in a first group of records of the first plurality of records having that MAC address and signal strength value divided by a count of unique timestamp values in a second group of records of the first plurality of records having that MAC address.

6. A method as claimed in claim 1, wherein the step of identifying a record of the second plurality of records having a BSSID that sufficiently matches the MAC address includes identifying a first set of the second plurality of records having a BSSID that sufficiently matches the MAC address, and the method further comprises the step of:
  determining, for each record of the first set of the second plurality of records, a difference value between the signal strength value associated with that record of the first set of the second plurality of records and the signal strength value associated with the MAC address of the first plurality of records; and identifying the record of the first set of the second plurality of records having the smallest difference value,
wherein the step of determining that a difference between the signal strength value associated with the identified record of the second plurality of records and the signal strength value associated with the MAC address of the first plurality of records is within a threshold includes determining that the smallest difference value between the signal strength value associated with the identified record of the first set of the second plurality of records and the signal strength value associated with the MAC address of the first plurality of records is within the threshold,
wherein the first hop repeater identifier is based on the BSSID of the identified record of the first set of the second plurality of records.

7. A method as claimed in claim 6, wherein the step of determining, for each record of the first set of the second plurality of records, a difference value between the signal strength value associated with that record of the first set of the second plurality of records and the signal strength value associated with the MAC address of the first plurality of records includes:
determining, for each record of the first set of the second plurality of records, a minimum difference between the signal strength value associated with that record of the second plurality of records and at least two of a group comprising:
a weighted signal strength value based on all signal strength values of all records of the first plurality of records having that MAC address,
a minimum signal strength value based on all signal strength values of all records of the first plurality of records having that MAC address,
a maximum signal strength value based on all signal strength values of all records of the first plurality of records having that MAC address, and
an average signal strength value based on all signal strength values of all records of the first plurality of records having that MAC address,
wherein the step of identifying the record of the first set of the second plurality of records having the smallest difference value includes identifying the record of the first set of the second plurality of records having the smallest minimum difference value.

8. A method as claimed in claim 6, wherein each record of the first plurality of records includes a wireless local area network band and each record of the second plurality of records includes a wireless local network band, the step of assigning the first hop repeater identifier to each record of the first plurality of records having the MAC address includes assigning the first hop repeater identifier to each record of the first plurality of records having the MAC address and a wireless local area network band, and the step of identifying the record of the first set of the second plurality of records having the smallest difference value includes:
identifying the record of the first set of the second plurality of records having a wireless local area network band matching the wireless local area network band of each record of the first plurality of records and has the smallest difference value.

9. A method as claimed in claim 6, wherein each record of the first plurality of records includes a wireless local area network band and each record of the second plurality of records includes a wireless local network band, the step of assigning the first hop repeater identifier to each record of the first plurality of records having the MAC address includes assigning the first hop repeater identifier to each record of the first plurality of records having the MAC address and wireless local area network band, and the step of identifying the record of the first set of the second plurality of records having the smallest difference value includes:
determining that no records of the first set of the second plurality of records has the wireless local area network band matching the wireless local area network band of each record of the first plurality of records, and
identifying the record of the first set of the second plurality of records having a wireless local area network band that does not match the wireless local area network band of each record of the first plurality of records and has the smallest difference value.

10. A method as claimed in claim 1, further comprising the steps of:
assigning a root repeater identifier to each record of the first plurality of records having the MAC address based on a SSID associated with the BSSID of the identified record of the second plurality of records.

11. A method as claimed in claim 10, further comprising the step of:
determining that a single SSID in the second plurality of records is associated with the BSSID of identified record of the second plurality of records,
wherein the assignment of the root repeater identifier to each record of the first plurality of records having the MAC address is based on the BSSID of the identified record of the second plurality of records.

12. A method as claimed in claim 10, further comprising the step of:
determining that a second set of the second plurality of records each include the SSID associated with the BSSID of the identified record of the second plurality of records;
identifying a record of the second set of the second plurality of records having the greatest signal strength value,
wherein the assignment of the root repeater identifier to each record of the first plurality of records having the MAC address is based on the BSSID of the identified record of the second set of het second plurality of records.

13. A non-transitory computer readable carrier medium storing a computer program comprising instructions which, when the program is executed by a computer, cause the computer to carry out the steps of claim 1.

14. The method as in claim 1, wherein the BSSID sufficiently matches the MAC address if a bit difference is less than or equal to a bit difference threshold.

15. A data processing device for operating a wireless local area network, the wireless local area network including a user device, a wireless access point and a wireless repeater, wherein the wireless repeater is configured to virtualise a Media Access Control (MAC) address of the user device when the user device is connected to the wireless repeater, the data processing device comprising a processor at least configured to:
obtain data including a first plurality of records, wherein each record of the first plurality of records relates to the user device and includes a MAC address and a signal strength value;

obtain data including a second plurality of records, wherein each record of the second plurality of records includes a Basic Service Set Identifier (BSSID) and a signal strength value;

for each MAC address in the first plurality of records:
identify a record of the second plurality of records having a BSSID that sufficiently matches the MAC address by determining a similarity between an Organisationally Unique Identifier (OUD of the BSSID and the OUI of the MAC address,
determine that a difference between the signal strength value associated with the identified record of the second plurality of records and the signal strength value associated with the MAC address of the first plurality of records is within a threshold, and
assign a first hop repeater identifier to each record of the first plurality of records having the MAC address based on the BSSID of the identified record of the second plurality of records; and cause a reconfiguration in the wireless local area network based on the first hop repeater identifier.

16. The data processing device as in claim 15, wherein the similarity between the OUI of the BSSID and the OUI of the MAC address is based on a bit difference between a binary value of the OUI of the BSSID and a binary value of the OUI of the MAC address.

17. The data processing device as in claim 15, wherein the similarity between the OUI of the BSSID and the OUI of the MAC address is based on a sum of a numeric difference between three octets of the OUIs.

18. The data processing device as in claim 15, wherein the BSSID sufficiently matches the MAC address if a bit difference is less than or equal to a bit difference threshold.

19. The data processing device as in claim 15, wherein the processor is further configured to:
determine the signal strength value associated with the identified record of the second plurality of records is as an average of the signal strength values of all records of the second plurality of records having that BSSID.

* * * * *